United States Patent
Lewis

(10) Patent No.: US 7,543,126 B2
(45) Date of Patent: Jun. 2, 2009

(54) APPARATUS, SYSTEM, AND METHOD FOR IMPLEMENTING PROTECTED VIRTUAL MEMORY SUBCONTEXTS

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/216,981

(22) Filed: Aug. 31, 2005

(65) Prior Publication Data

US 2007/0050580 A1    Mar. 1, 2007

(51) Int. Cl.
*G06F 12/14* (2006.01)

(52) U.S. Cl. .............. 711/163; 711/147; 711/E12.096; 710/200

(58) Field of Classification Search ................ 711/163
See application file for complete search history.

(56) References Cited

U.S. PATENT DOCUMENTS

| | | | |
|---|---|---|---|
| 5,390,336 A | 2/1995 | Hillis | 395/800 |
| 5,465,369 A | 11/1995 | Minca | 395/200.03 |
| 6,256,657 B1 | 7/2001 | Chu | 709/1 |
| 6,647,423 B2 | 11/2003 | Regnier et al. | 709/100 |
| 6,738,977 B1 | 5/2004 | Berry et al. | 719/332 |
| 2002/0062401 A1 | 5/2002 | Auslander et al. | 709/312 |
| 2002/0099862 A1 | 7/2002 | Mikalsen et al. | 709/310 |
| 2003/0061499 A1* | 3/2003 | Durrant | 713/189 |
| 2003/0088743 A1* | 5/2003 | Rader | 711/148 |
| 2003/0093487 A1 | 5/2003 | Czajkowski et al. | 709/213 |
| 2005/0114868 A1* | 5/2005 | Conroy et al. | 719/321 |

* cited by examiner

*Primary Examiner*—Matt Kim
*Assistant Examiner*—Michael C Krofcheck
(74) *Attorney, Agent, or Firm*—Kunzler & McKenzie

(57) ABSTRACT

The apparatus, system and method implement subcontexts which associate groups of memory blocks. The apparatus, system and method maintain a permissions mapping for inter-subcontext memory accesses. A control module monitors all inter-subcontext memory accesses and prevents those accesses for which a permissions mapping does not exist.

15 Claims, 7 Drawing Sheets

308

| Target Subcontext | Accesor Subcontext | Permission Mask |
|---|---|---|
| T | A | RW |
| T | B | RWX |
| A1 | C | R |
| T1 | A1 | R |

310

| Target Subcontext | Accessor Subcontext | Entry Point Address |
|---|---|---|
| T | A | FA00002B |
| T | B | FA000000-FA000FF |
| A1 | C | CD008900 |
| T1 | A1 | |

308

| Target Subcontext | Accesor Subcontext | Permission Mask |
|---|---|---|
| T | A | RW |
| T | B | RWX |
| A1 | C | R |
| T1 | A1 | R |

310

| Target Subcontext | Accessor Subcontext | Entry Point Address |
|---|---|---|
| T | A | FA00002B |
| T | B | FA000000-FA000FF |
| A1 | C | CD008900 |
| T1 | A1 | |

FIG. 4

APPARATUS, SYSTEM, AND METHOD FOR IMPLEMENTING PROTECTED VIRTUAL MEMORY SUBCONTEXTS

BACKGROUND OF THE INVENTION

1. Field of the Invention

This invention relates to memory protection in computing devices and more particularly relates to protecting memory according to the current code execution point.

2. Description of the Related Art

In the early days of computing devices, only one program ran on a computer at a time. The running program had complete control over the hardware in the machine including the logic devices, the processor, memory, input devices and output devices. Bugs in the running program could cause the running program to operate incorrectly or to terminate. However, no other programs were affected since only one program ran at a time.

As computers became more complex, multiple programs ran on a single computer. A multitasking kernel regulated access to the processor in various ways. In a common multitasking implementation, the kernel schedules each program running on the computer for a short time slice. One program runs during each time slice. At the end of each time slice, the kernel saves the state of the current running program and then restores the state of a suspended program and allows the suspended program to run during a new time slice. With time slices on the order of milliseconds, the computer is able to run multiple programs serially while giving the impression that the programs are running simultaneously.

In early multitasking environments, each program had complete control of the computer during its time slice. The current running program had control over the processor, the memory, the input devices and the output devices. The current running program had the ability to affect memory allocated to suspended programs. A word processor program had the ability to modify memory assigned to an accounting program. Even though software programmers tried to avoid such mistakes, they did happen and caused many problems. Memory accesses by one program into the memory assigned to another program were common and particularly difficult to detect.

In response to these problems, computer architects and software designers worked together to design process-based protected memory systems. In a process-based protected memory system, the kernel runs programs in processes. The kernel allocates memory to programs on a process basis.

For example, the kernel starts a program in a process. The kernel schedules the process to run and allocates time slices in which the process runs. When the program is the current running process, it requests a block of memory from the kernel. The kernel then allocates a block of memory and associates the memory block with the specific process.

The kernel, in conjunction with dedicated hardware, monitors memory accesses by the running process. Accesses by the running process to memory currently assigned to the running process are allowed. However, accesses by the running process to memory not assigned to the running process create an exception. The kernel handles the exception and prevents the access to memory not allocated to the current process.

The process-based protected memory system achieves its purpose—preventing concurrent running programs from affecting computer resources allocated to other programs. However, it achieves its purpose at a price. First, the amount of time required to switch from one process to another increases. Second, the process switches must happen more frequently in order to handle inter-process communication (IPC). Third, requests of the kernel for computer resources must be regulated either by a process switch or by a system interrupt, creating switching overhead and tying up critical kernel resources.

The kernel must keep track of the memory blocks and permissions assigned to each process. Typically, the kernel uses a page table for each process to store this information. The page table maintains a mapping of virtual addresses used by the running process to physical memory locations. It also tracks which memory has been swapped to disk. The page table for a single process may be quite large. Many computer systems utilize a translation look-aside buffer (TLB) to cache the page table to accelerate address translations.

Process switching is a time-consuming process. When a process is scheduled by the kernel, the kernel flushes the TLB and sets a pointer to the new page table. Parts of the page table may have to be loaded into memory, and additional memory pages associated with the process including code pages and data pages may have to be loaded into memory. By allocating memory to processes in this way, the kernel is able to restrict inter-process memory accesses. However, even simple calls from one process to another incur a process switch overhead.

Exceptions to the process-based protected memory system exist in order to allow the kernel and highly trusted programs to access all memory in the computer. For instance, the kernel normally runs in a privileged mode which allows it to access any memory address without causing an exception. In addition, certain device drivers and shared libraries may run at a privileged level as well. These exceptions reduce the number of required process switches, but also decrease system stability.

Many proposals have been made to reduce the size of kernel code and push as many system level services as possible into non-kernel applications. This type of system is sometimes referred to as a microkernel. An operating system based on a microkernel separates many system functions from the kernel. These separated system functions may exist in system code segments or in separate processes.

If the separated system functions exist as system code segments, then they must be called by non-trusted processes. Under a process-based memory protection architecture, such a design would allow non-trusted programs to directly call system code, bypassing memory protection standards. Alternatively, the system functions may be implemented as separate processes which will service requests from non-trusted processes. However, creating additional processes to carry out system functions will create high overhead costs associated with process switches.

From the foregoing discussion, it should be apparent that a need exists for an apparatus, system, and method that allow applications running on a computing device to directly call system functions without incurring process switching overheads while maintaining memory protection standards to prevent non-trusted applications from accessing system resources inappropriately. Beneficially, such an apparatus, system, and method would increase system stability while reducing the time required to call system functions. Such an apparatus, system and method would also reduce the overhead associated with inter-process communication.

SUMMARY OF THE INVENTION

The present invention has been developed in response to the present state of the art, and in particular, in response to the problems and needs in the art that have not yet been fully solved by currently available memory protection systems. Accordingly, the present invention has been developed to provide an apparatus, system, and method for implementing protected virtual memory subcontexts that overcome many or all of the above-discussed shortcomings in the art.

The apparatus to implement protected virtual memory subcontexts is provided with a logic unit containing a plurality of modules configured to functionally execute the necessary steps of assigning memory blocks to specific subcontexts, storing the assignments in a subcontext mapping module, storing inter-subcontext memory access permissions in the subcontext mapping module, tracking the identity of the current subcontext, tracking inter-subcontext memory accesses by the current subcontext, and blocking such memory accesses that are not allowed by the inter-subcontext memory access permissions stored in the subcontext mapping module.

The apparatus, in one embodiment, is configured to block prohibited inter-subcontext memory reads and writes.

The apparatus is further configured, in one embodiment, to maintain a table of subcontext entry points and associated permissions and to block inter-subcontext program calls that do not use properly registered subcontext entry points or that do not have the correct permissions to make such calls.

In a further embodiment, the apparatus may be configured to facilitate inter-process communications.

A system of the present invention is also presented to implement protected virtual memory subcontexts. The system may be embodied by a central processing unit, a random access memory, a subcontext mapping module, and a control module configured to prevent inter-subcontext memory accesses which are not allowed by the permissions stored in the subcontext mapping module. In particular, the system, in one embodiment, further includes an entry point table configured to maintain a list of subcontext entry points and inter-subcontext permissions and to block inter-subcontext program calls that do not utilize a registered subcontext entry point with appropriate permissions.

A method for servicing and installing the present invention is also presented for implementing protected virtual memory subcontexts. The method in the disclosed embodiments substantially includes the steps necessary to install or service the present invention. In one embodiment, the method includes integrating computer readable code into a computing system wherein the code in combination with the computing system assigns memory blocks to subcontexts, stores inter-subcontext access permissions in a subcontext mapping module, tracks the identity of the current subcontext, tracks inter-subcontext memory accesses by the current subcontext, and blocks such accesses for which no matching permissions are stored in the subcontext mapping module. The method also may include maintaining a subcontext entry point module and the blocking of inter-subcontext program calls not registered in the subcontext entry point module. The method may also block calls for which no matching permissions are stored in the subcontext entry point module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 illustrates two tables that might be used in one embodiment of the present invention;

DETAILED DESCRIPTION OF THE INVENTION

Figure 1:
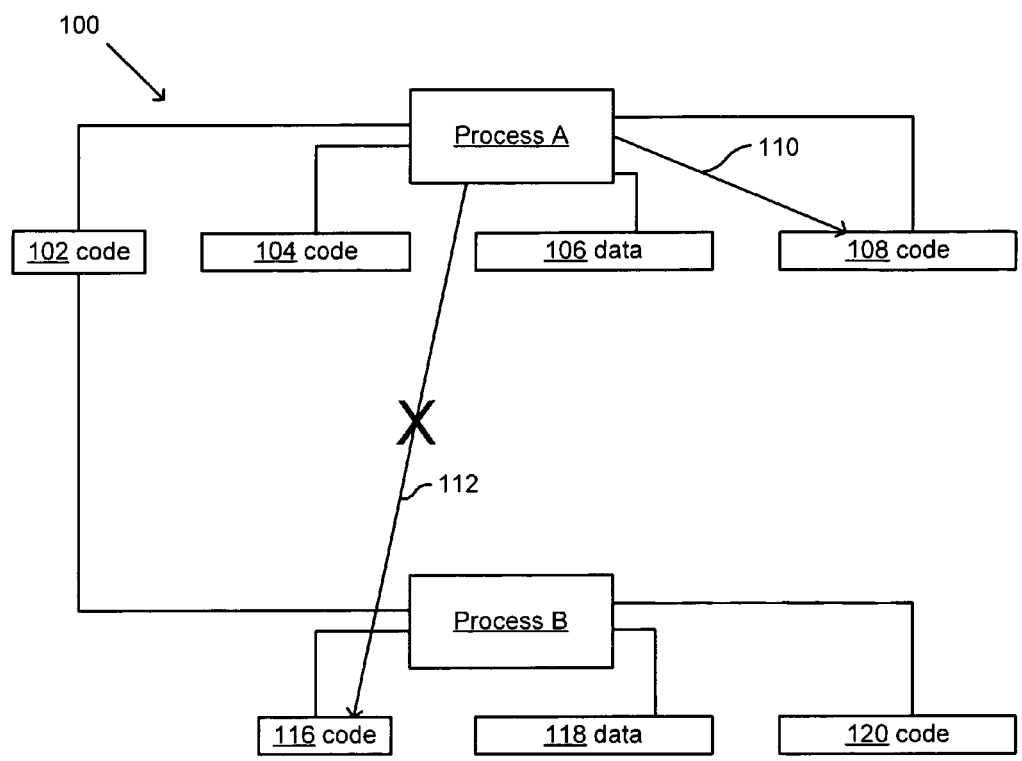
FIG. 1 is a schematic block diagram illustrating a prior art process-based memory protection architecture.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, or integrated circuits. A computer readable storage medium may be embodied by a compact disk, digital-video disk, a magnetic tape, a Bernoulli drive, a magnetic disk, a punch card, a flash memory, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a legacy process-based protected memory computing device 100 showing the logical assignments of memory blocks to processes. Traditional computing systems implement multitasking operating systems running multiple processes in a pseudo-parallel environment. Memory is allocated by the system to each process individually.

In computing device 100, Process A runs independently of Process B. Memory blocks 104, 106 and 108 are allocated to Process A. Orthogonal lines in the figure connecting processes to memory blocks illustrate a logical assignment of a particular memory block to a particular process. Memory blocks 116, 118, and 120 are allocated to Process B. Memory block 102 is shared between Process A and Process B.

Memory blocks may be allocated from a random access memory (RAM) or other storage medium. The memory blocks may contain data or code as shown. Legacy systems frequently create shared, read-only memory blocks like 102 to hold reentrant library service code which may be called by multiple processes.

In computing device 100, certain memory accesses are blocked by the system while others are allowed. A memory access may be a request to read memory, a request to access memory or a request to execute code at a specific memory location. In the figures, solid diagonal lines represent memory accesses. Memory accesses by a process to memory allocated to the same process are generally allowed. Memory access 110 is allowed since the memory access by Process A targets memory block 208 which is allocated to Process A.

Alternatively, memory access 112 by Process A into memory block 116 is blocked because memory block 116 is not allocated to Process A, but is allocated only to Process B. Either process may access memory in shared memory block 102 since the memory block 102 is allocated to both Process A and Process B.

This methodology of memory protection based on allocation of memory blocks to specific processes and the prevention of accesses by one process to memory not allocated to that process is termed process-based memory protection. Process-based memory protection may be aided by specialized processors, buses, registers and tables to reduce the overhead of implementing process-based memory protection.

Each process along with its associated memory is a context. A context switch occurs when the computing device suspends one process and activates a second process. Context switching incurs certain time-consuming overhead costs associated with flushing buffers, increased cache misses, saving of pages to secondary storage, restoration of pages from secondary storage and similar activities.

Figure 2:
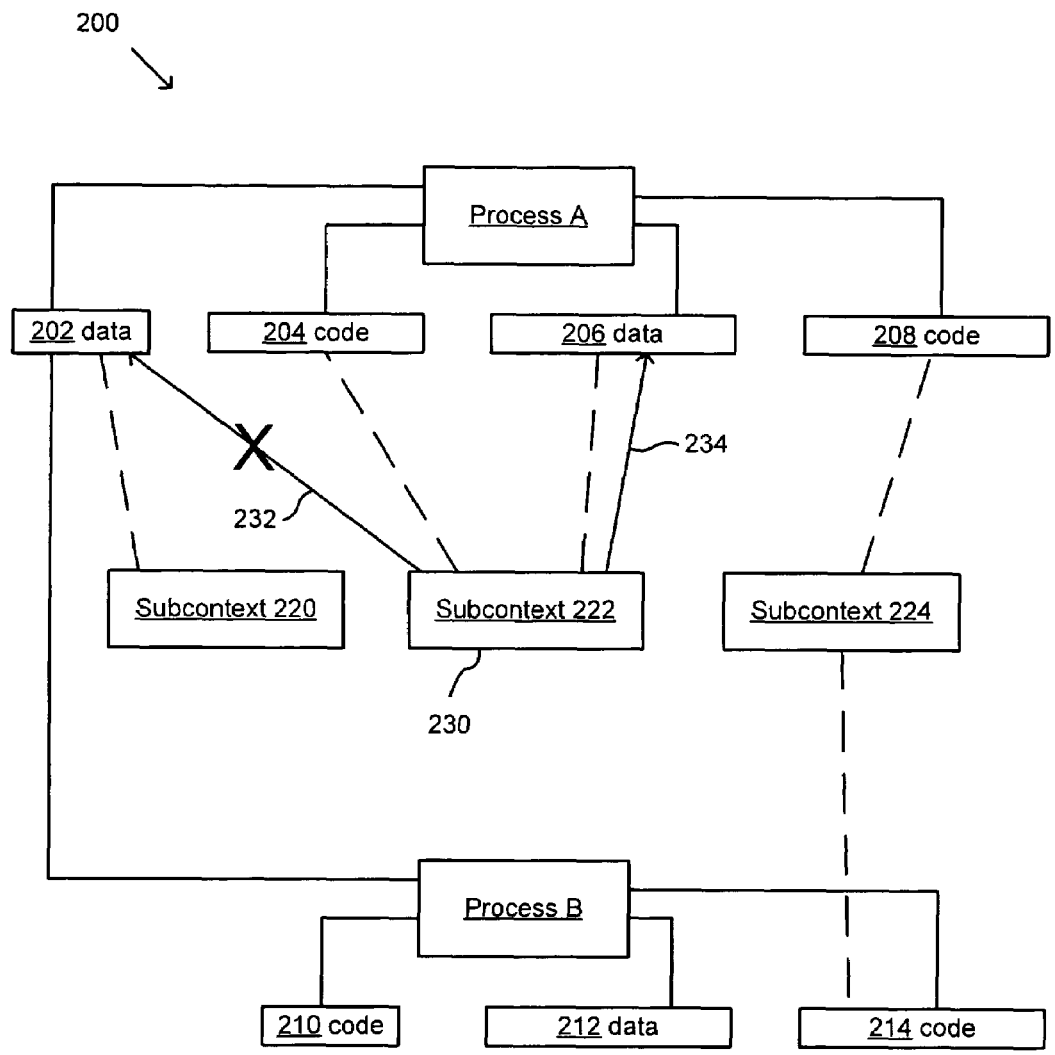
FIG. 2 is a schematic block diagram illustrating one embodiment of an apparatus for controlling memory accesses between subcontexts in a computing device in accordance with the present invention.

FIG. 2 is a schematic block diagram illustrating one embodiment of an apparatus for controlling memory accesses in a computing device in accordance with the present invention. FIG. 2 depicts computing device 200. Process A and Process B are running on computing device 200 in a multitasking environment. Memory blocks 204, 206 and 208 are allocated to Process A while memory blocks 210, 212 and 214 are allocated to process B. Memory block 202 is shared between Processes A and B.

FIG. 2 also depicts one of the key elements of the present invention—the subcontext. A subcontext is a logical grouping of memory. A subcontext may include one or more memory blocks. However, any particular memory location may be included in only one subcontext. Dashed diagonal lines illustrate assignments of memory blocks to subcontexts. Subcontext 220 includes memory block 202, shown by the dashed line. Memory block 202 is not shared with any other subcontext, even though it is shared between Process A and Process B. Subcontext 222 includes memory blocks 204 and 206. Subcontext 224 includes memory blocks 208 and 214.

A subcontext is active when the current code execution point is pointing to a memory address located inside a memory block associated with the given subcontext. For example, if the computing device is currently executing code which is stored in memory block 204, then the active subcontext 230 is subcontext 222. When the thread of code execution point moves to another memory block, not allocated to the active subcontext, then the active subcontext changes to the subcontext associated with the memory block containing the current code execution point. For example, if the processor starts processing code located in memory block 208, then subcontext 224 would become the active subcontext.

While the process-based memory protection scheme may continue operative in parallel or as part of the present invention, the present invention introduces additional memory protection rules which are enforced by the computing device. With the present invention, generally, the active subcontext is blocked from accessing memory not associated with the active subcontext. For instance, the present invention allows memory access 234 because the active subcontext 222 is accessing memory inside its own subcontext.

However, the present invention blocks memory access 232 by active subcontext 222 into memory block 202 because memory block 202 is not allocated to the active subcontext 222. Rather, it is allocated to subcontext 220.

This figure illustrates the combination of process-based memory protection and subcontext-based memory protection. In the example shown, if the active Process A is the active process at the time of memory access 234, then the process-based memory protection would allow the access. However, if Process B is active at the time of memory access 234, then the process-based memory protection would block memory access 234. Used together, both memory protection schemes may block a memory access.

The present invention includes overrides to allow the active subcontext to access memory in a second subcontext. A target subcontext, or a privileged subcontext may create a permission mapping to allow an accessor subcontext to access memory allocated to the target subcontext. For instance, subcontext 220 may create a mapping allowing subcontext 222 to have read access to subcontext 220. This permission mapping is stored in a subcontext mapping module 308 (See FIG. 3). With such a permission mapping in place, memory access 232 would be allowed for reads only.

A permission mapping may be created for read, write, and execute permissions. A read permission mapping would allow an accessor subcontext to read data associated with a target subcontext. Similarly, a write permission mapping would allow an accessor subcontext to write data associated with a target subcontext. An execute permission mapping would allow an accessor subcontext to execute code in the target subcontext. Of course, execution of code in a target subcontext would cause the active subcontext to switch to the target subcontext since the code execution point would have shifted to the target subcontext. Another means of controlling inter-subcontext program calls will be discussed below in reference to FIG. 3.

Also, in some embodiments permission mappings may be transitive. If a mapping allowing subcontext A to access subcontext B exists and a mapping allowing subcontext B to access subcontext C also exists, then an implicit mapping of subcontext A to C is allowed. However, reflexive permission mappings are not implied. A permission mapping from A to B does not imply that a mapping from B to A is allowed without an explicit mapping.

Figure 3:
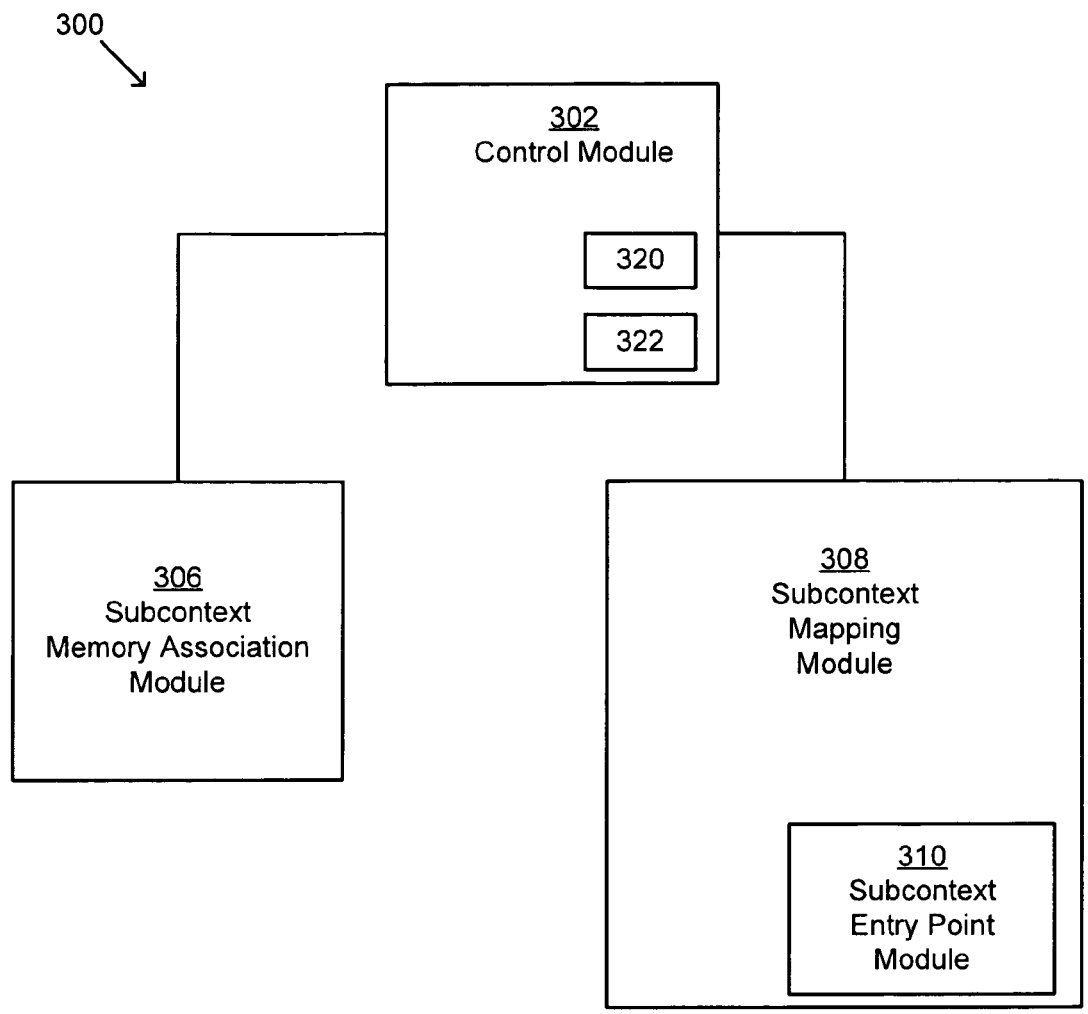
FIG. 3 is a block diagram illustrating some of the modules of one embodiment of the present invention.

FIG. 3 depicts a logical representation of the major components of an embodiment of an apparatus of the present invention 300. The apparatus 300 comprises a control module 302, a subcontext memory association module 306 and a subcontext mapping module 308. Portions of the subcontext mapping module 308 may be implemented as a subcontext entry point module 310.

The subcontext memory association module 306 provides a means to track which memory blocks are associated with a given subcontext. This may be implemented in many ways. It may be implemented as a table listing all of the subcontexts in the computing device along with the associated memory blocks. It may also be implemented by creating an additional field in each page table entry. The additional field would identify the subcontext to which the associated page appertains. As illustrated by these two examples, the subcontext memory association module may be implemented as a tightly integrated object or as a loosely coupled mechanism.

The subcontext mapping module 308 maintains a list of the permission mappings. As discussed above, a permission mapping specifies which subcontexts may access the memory associated with a target subcontext. For example, a permission mapping stores an accessor subcontext A mapped to a target subcontext T with an associated permission mask M: (A, T, M). Such an entry allows subcontext A to access memory in subcontext T according to the permissions specified by the permission mask M.

Memory accesses include reads, writes, and execute accesses. Normally, a permission mapping is registered in the subcontext mapping module by the target. However, registrations by the operating system may be allowed or registrations by special privileged subcontexts.

Additionally, the execute mapping portion of the subcontext mapping table may be implemented as a submodule shown as a subcontext entry point module 310. The subcontext entry point module 310 maintains a list permission mappings for inter-subcontext code execution.

In one embodiment the subcontext entry point module maintains a list of entry points for each subcontext. The entry point entries store an accessor subcontext A, a target subcontext T and an entry point address X: (A->T, X). The entry (A->T, X) allows accessor subcontext A to execute an entry point at address X in target subcontext T. The entry point address X may be specified as a single entry point address or as a range of addresses. However, limiting the entry points to single addresses may provide a higher level of security. As with other permission mappings, only the target subcontext or a privileged subcontext may create an entry in the table for a given target subcontext.

The control module 302 monitors memory accesses and inter-subcontext code execution and enforces subcontext-based memory protection. In some embodiments, the control module may include a current subcontext reference 320 and may include a previous subcontext reference 322.

The control module may monitor memory accesses by detecting subcontext faults. Similar to page faults, subcontext faults occur when the current subcontext attempts to access memory outside the current subcontext. This may be implemented in hardware or in software.

In one embodiment of the present invention, subcontext fault detection is implemented in software. The control module modifies page permissions for all pages not included in the current subcontext such that a page fault will be generated for accesses to pages outside of the current subcontext. Memory accesses to pages not associated with the current subcontext cause a page fault which is handled by the control module. The control module then checks entries in the subcontext mapping module and the subcontext entry point module to determine if the fault should be ignored. If access is allowed, the control module passes execution to the page fault handler to ensure that process-based memory protection allows the access as well. If access is denied, the subcontext is blocked from accessing the requested memory.

In another embodiment of the present invention, the control module is implemented in hardware by adding additional registers to the CPU and modifying the memory protection logic to include checks for inter-subcontext accesses. The subcontext memory association module 306 is implemented as a new field in each entry of the page table, associated with each memory page. Memory pages are assigned to subcontexts and the subcontext association is recorded in the page table.

One skilled in the relevant art will recognize that control module 302, subcontext memory association module 306 and the subcontext mapping module 308 may be implemented in hardware, in software, or in a combination of the two, according to techniques currently known in the art. Likewise, inter-subcontext execution protection may be implemented as part of the read and write access protection of the subcontext mapping module 308 or as a subcontext entry point module 310 as a submodule of the subcontext mapping module 310.

In some legacy systems, virtual memory addresses are translated by the page table or the translation look aside buffer into physical addresses. Some systems store the process ID for the process associated with the current page as a field in the corresponding record of the page table. During the request for memory, the address translation logic compares the current process ID to the process ID stored in the page table entry for the requested page. If the process IDs do not match, an exception is generated.

Similarly, according to one embodiment of the present invention, the address translation logic compares the subcontext ID in the page table to the subcontext ID of the active subcontext. If the two do not match and no permission mapping exists in the subcontext mapping module, a subcontext memory exception is generated, preventing access to the requested memory.

The control module logic may be implemented in software, hardware or a combination of the two. Similarly, the subcontext memory association module 306, the subcontext mapping module 308, and the subcontext entry point module 310 may be implemented in hardware, or in software or in a combination of the two.

FIG. 4 depicts a more detailed logical representation of one embodiment of the fields stored in the subcontext mapping module 308 and the subcontext entry point module 310. The subcontext mapping module is shown with three columns, a target subcontext, an accessor subcontext, and a permission mask. For an inter-subcontext memory access, the control module 302 (See FIG. 3) checks the subcontext mapping module to determine if an entry for the target-accessor pair exists. The first entry in the depicted table allows an access by subcontext A to subcontext T for read and write. The second entry allows subcontext B to access subcontext T for read, write and execute operations. The third entry allows subcontext C to access subcontext A1 for read only. Finally, the fourth entry allows subcontext A1 to access subcontext T1 for read only access.

Note that in some embodiments of the present invention, subcontext permissions may be transitive. Thus, in the base where a subcontext appears in both the target and accessor columns, a transitive access may be allowed. In the example shown. C may access A1, and A1 may access T1. Since both entries allow read only access, C would be able to access T1 for read only as well.

Similarly, subcontext entry point module 310, depicts one embodiment of the entry point module 310. Three columns are shown: target subcontext, accessor subcontext, and the entry point address or range of addresses. The first entry allows subcontext A to call into a single address, 0xFA00002B, in subcontext T. The second entry allows subcontext B to call into a range of addresses in subcontext T. The third entry allows subcontext C to call into a single entry point in subcontext A1, and the fourth entry allows subcontext A1 to call into any address in subcontext T1.

Note that subcontext A1 is listed as a target subcontext in one entry and as an accessor subcontext in another entry. Due to the transitive nature of some subcontext implementations, subcontext C would also be able to execute any code location in subcontext T1. In some implementations, the same would apply to data accesses if similar transitive permissions were configured in the subcontext mapping module 308.

The diagrams are for illustrative purposes only. Various optimizations to consolidate entries and to optimize searches in the tables would be obvious to those skilled in the art.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
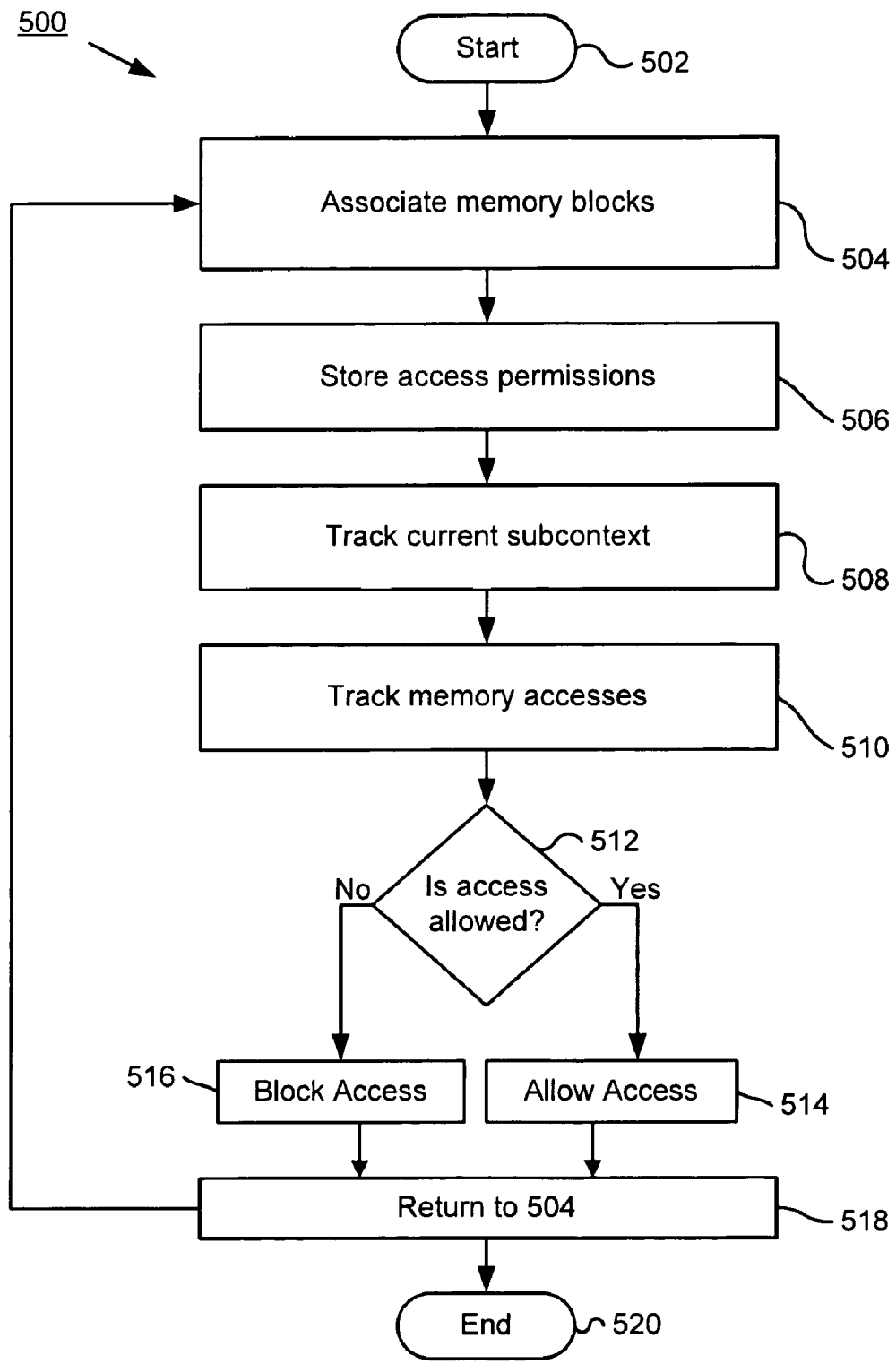
FIG. 5 is a schematic flow chart diagram illustrating one embodiment of a method for memory protection in accordance with the present invention.

FIG. 5 is a flowchart depicting a method 500 for implementing protected memory virtual subcontexts. In one embodiment, the method 500 is executed as a result of following the instructions contained in a signal bearing medium tangibly embodying a program of machine-readable instructions. The set of operations 500 comprise starting 502, associating memory blocks with subcontexts 504, storing access permissions 506, tracking the active subcontext 508, tracking memory accesses 510, determining if the memory access is allowed 512, blocking or allowing access 516 and 514, and returning to 504, 518 and ending 520.

Associating memory blocks 504 may be initiated as part of the initialization of the computing device and continues as new programs start and terminate. Generally, the active subcontext, which may be executing a new program, requests memory resource from the computing device and assigns those memory resources to specific subcontexts. The subcontext memory association module 306 described in reference to FIG. 3 may be implemented as a single table or as references stored as a field for each entry of the page table. Likewise, the associations may be implemented in a distinct manner, obvious to those of skill in the art.

The association of memory to subcontexts may be controlled by the computing device or by the active subcontext. However, the active subcontext normally will not have the authority to modify the associations of memory previously assigned to other subcontexts.

Storing access permissions 506 creates entries in the subcontext mapping module 308 of FIG. 3. Each entry creates an override option for inter-subcontext memory accesses. Generally, the active subcontext creates entries in the table with itself as the target subcontext, allowing another subcontext to act as the accessor subcontext. A privileged subcontext may assign permissions for other target subcontexts.

Tracking the active subcontext 508 is one function performed by the control module. In actual implementation, this function of the control module may be implemented as a hardware register or as a software module. The active subcontext may be determined by identifying the current thread of execution and by then determining which subcontext is associated with the memory block containing the code that is currently being executed.

Tracking memory accesses 510 involves monitoring all inter-subcontext memory accesses. This may be implemented in software or hardware. In some implementations, it may involve installing an exception handler that runs anytime a memory page not associated with the active subcontext is accessed. In another implementation, access control may be handled by dedicated hardware.

Determining whether the inter-subcontext memory access is allowed 512 involves locating an entry in the subcontext mapping module which corresponds to the active subcontext, the target subcontext, and the memory access type. If an entry for the current memory access exists, then the memory access is allowed 514. If no entry for the current memory access request exists, then the memory access is blocked 516.

Finally, the process continues by returning (518) to 504. In actual implementation, these operations may be performed in parallel in or in a different order than shown here, depending on the architecture of the computing device.

Figure 6:
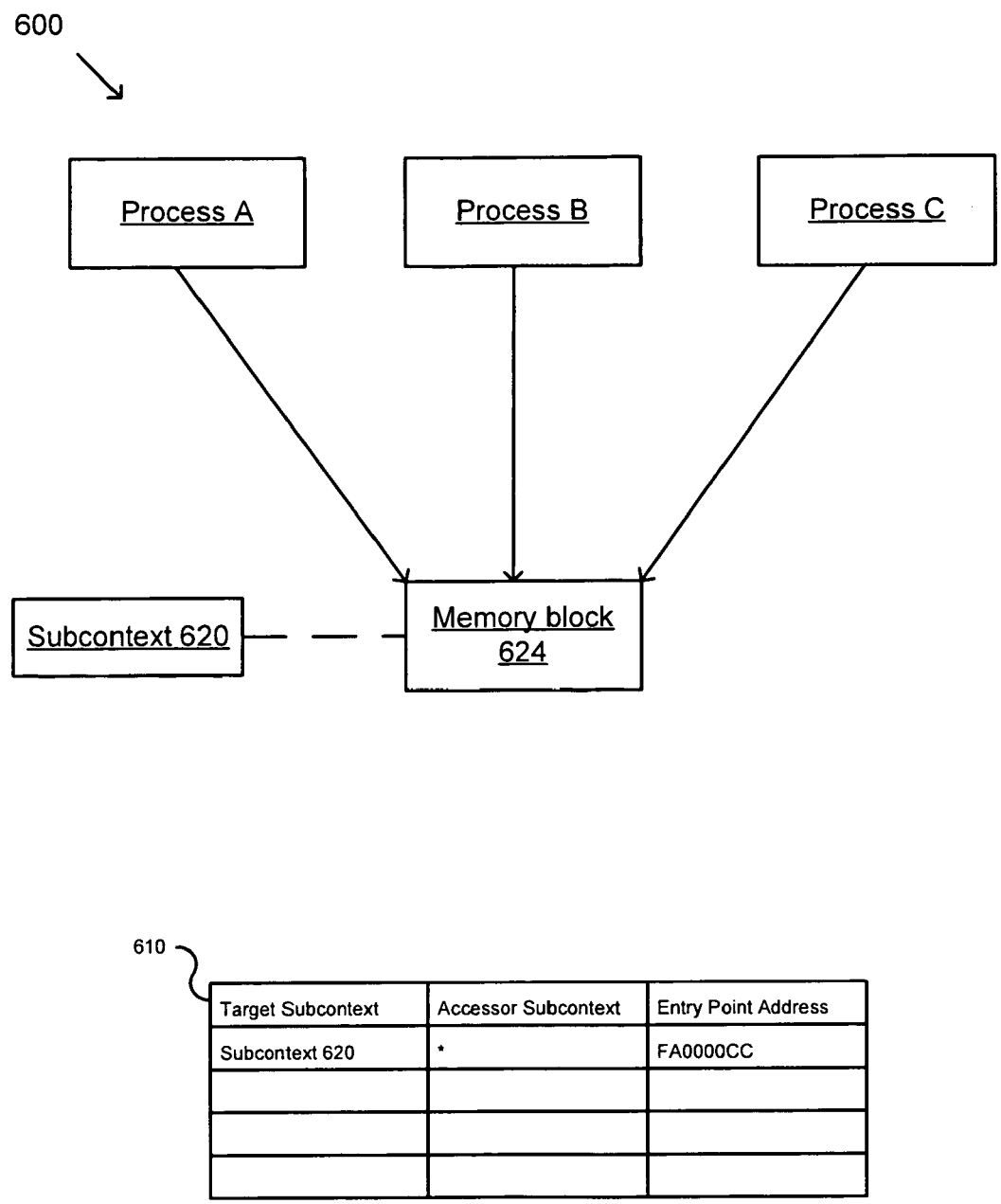
FIG. 6 is a block diagram illustrating relationships between processes and subcontexts in one embodiment of the present invention.

FIG. 6 depicts a logical relationship of processes and subcontexts 600 in one embodiment of a service subcontext access. The logical relationship 600 comprises three processes, Process A, Process B, and Process C. Relationship 600 further comprises a subcontext 620. Memory block 624 containing executable code is associated with subcontext 620. No other subcontexts or processes are associated with subcontext 620.

In addition, logical relationship 600 further comprises subcontext entry point module 610. Entry point module 610 contains an entry point entry whose target subcontext corresponds to subcontext 620. The entry point further includes a code entry point and an accessor subcontext set to an asterisk '*'. As encoded, this entry point allows any other subcontext to call into the entry point address listed in the entry point record in subcontext The logical relationship 600 illustrates one way in which the present invention may be used to implement a service library which can be accessed by non-trusted code. Process A may call into system level code stored in memory block 624. The present invention allows Process A to only call into the certified code entry point registered in the entry point module 610. Since the thread of execution continues under Process A, no context switch is required, saving context switching overhead normally associated with calls into a system library.

Process B and Process C may also call the service library routine at the same entry point. If the service subcontext code is written in a reentrant fashion, then no semaphores or other blocking logic need be included. However, if the service subcontext code is written in a non-reentrant fashion, then blocking mechanisms may be used to prevent simultaneous use of the code by more than one process.

In addition, the service subcontext code located in memory block 624 may be configured to have access to the subcontext from which it was called. For instance, the code and data segments associated the active subcontext running under Process A may be made accessible to the subcontext 620. Typically, the code and data segments of a calling subcontext are accessible by a target subcontext, but this is not always the case. This allows the system library code in memory block 624 to update data constructs in the calling subcontext without incurring a context switch. In this way, two context switches are avoided when a system service call is implemented using the present invention. Also, the calling code may be a non-trusted user application. In some cases, a software designer may wish to restrict the target subcontext from having access to data or code in the calling subcontext. The present invention allows the software designer to make this decision.

FIG. 6 illustrates still another aspect of the present invention. In FIG. 6, Process A, Process B, and Process C each have references to a shared memory segment which is associated with subcontext 620. Generally, each process may use distinct virtual addresses to reference the same location in a shared memory segment. However, in one embodiment of the present invention, the virtual addresses used to access certain memory segments associated with specific subcontexts are required to be identical. Thus, Process A, Process B, and Process C would access the same memory location in memory block 624 using the same virtual address.

Due to the limited amount of addressable memory in some computer architectures, it is necessary to reuse virtual addresses. Two subcontexts which use the same virtual addresses to address different memory locations are termed "overlapping" subcontexts. Overlapping subcontexts will be required on many implementations where there is a shortage of available address space; other implementations may have a large enough address space that they are not required. For example, 32-bit and 64-bit architectures, are current examples of, respectively, of implementations that typically have a shortage of and abundance of address space.

Those skilled in the relevant art will understand that system designers typically allocate a portion of memory to be accessed with non-overlapping virtual addresses. Identical virtual addresses from this group of non-overlapping addresses map to the same physical location, regardless of which process uses the virtual address. Generally, system designers allocate the non-overlapping memory for system code and allocate overlapping memory addresses for application code.

Referring again to FIG. 6, by allocating service contexts from non-overlapping memory, it is possible to ensure that calls from application processes, for example, Process A, Process B, and Process C, will all use the same virtual address to access memory block 624. In this way, the page table, which translates virtual addresses, need not be updated to accommodate inter-subcontext service calls.

In addition, memory block 624 may be used for inter-process communication. Memory block 624 may be allocated from a non-overlapping section of the virtual address space. Subcontext 620 may map into Process A, Process B, and Process C. In this way, each of the Processes would be able to access memory block 624 using the same virtual address. The three processes could use memory block 624 for the passing of inter-process communications.

The same inter-process communication could be achieved with overlapping addresses, but non-overlapping addresses would greatly reduce the overhead for passing data between two processes. On a computer architecture with an abundance of available virtual addresses available, it may be desirable to allocate all memory from non-overlapping address spaces.

Figure 7A:
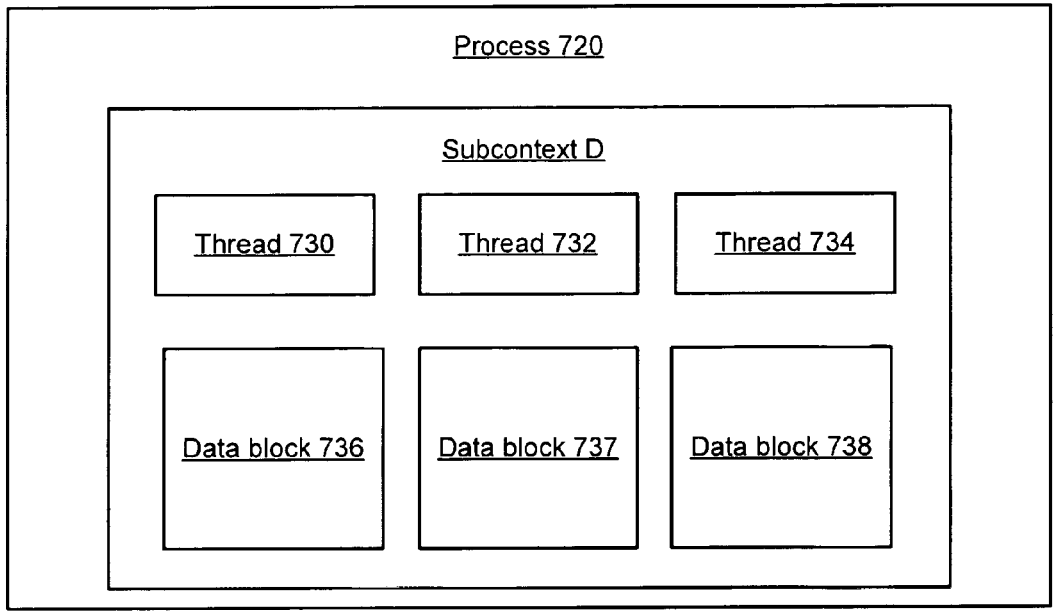
FIGS. 7a and 7b are block diagrams illustrating two possible thread implementations in conjunction with the present invention.
Figure 7B:
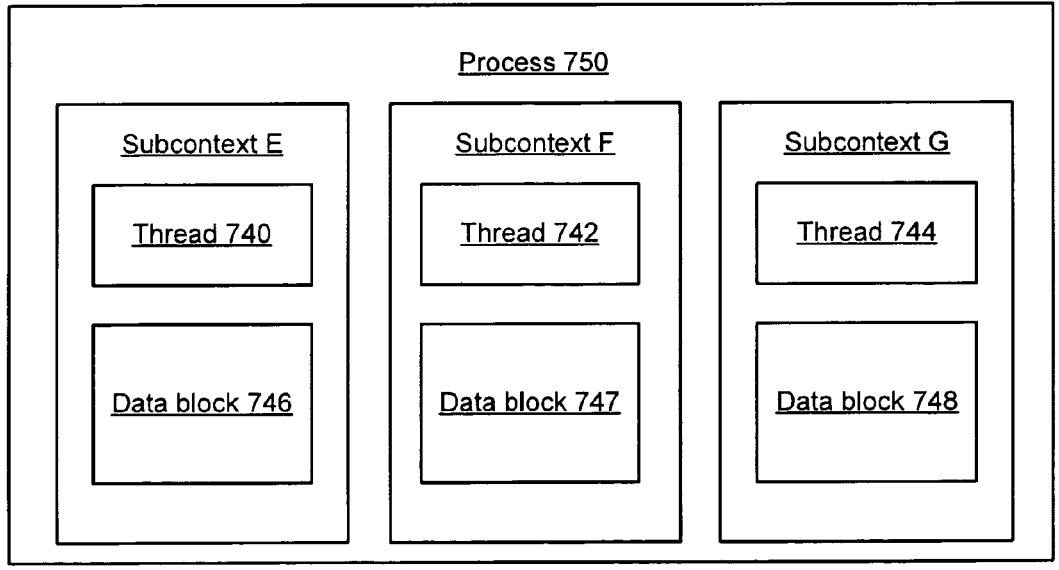

FIGS. 7a and 7b depict two possible implementations of threads using the present invention. In FIG. 7a, three threads, 730, 732 and 734, each run in one subcontext. Saying that a thread runs in a subcontext simply means that the code segment containing the executable code for the thread is associated with that subcontext. When that code is being executed, that subcontext is the active subcontext and the thread is running in that subcontext. In the FIG. 7a, the code for each thread is associated with subcontext D and each thread runs under the time slice of Process 720. Since each thread is running in the same subcontext, no subcontext memory protection prevents thread 730 from accessing any of the data blocks 736, 737, or 734.

In contrast, FIG. 7b depicts three subcontexts E, F, and G. Threads 740, 742, and 744 run under their respective subcontexts, E, F, and G. Thread 740 may access data block 746 because it is associated with thread 740's subcontext. However, thread 740 is prevented from accessing data blocks 747 and 748 because they are not associated with thread 740's subcontext.

Threads are often referred to as a lightweight process without memory protection. Under this embodiment of the present invention, the threads are provided with protected memory while not incurring the overhead of process switching. Each thread runs under the process control of Process 750. In another embodiment, not shown, threads running in the same subcontext may run under different processes as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling memory accesses between subcontexts in a computing device, the apparatus comprising:
    a subcontext memory association module configured to manage assignments of memory blocks into subcontexts;
    a subcontext mapping module configured to maintain inter-subcontext memory access permissions, registered entry points, and inter-subcontext entry point permissions for each subcontext, each registered entry point comprising an accessor subcontext, a target subcontext, and a single entry point address, wherein only the target subcontext may create a registered entry point for the target subcontext; and
    a control module configured to prevent an inter-subcontext code call from the accessor subcontext to the target subcontext which does not use the registered entry point with an inter-subcontext entry point permission allowing the accessor subcontext to call into the target subcontext at the entry point address.

2. The apparatus of claim 1, wherein the memory access is selected from the group consisting of a memory read, a memory write, and an instruction load.

3. The apparatus of claim 1, wherein the computing device implements in hardware a cache for the subcontext mapping module, a hardware cache for an entry point table, and a register for the subcontext associated with a current code execution point.

4. The apparatus of claim 1, further comprising a page table configured to allocate memory pages from a random access memory, wherein the control module also prevents a memory access by a process to a memory location of the random access memory not assigned to the process.

5. The apparatus of claim 1, wherein the subcontext memory association module is further configured to associate a memory block accessible by a plurality of processes with a subcontext.

6. The apparatus of claim 5, wherein a single virtual address is configured to allow the plurality of processes to access the memory block.

7. The apparatus of claim 5, wherein the memory access permissions in the subcontext mapping module are further configured to allow inter-process communication among the plurality of processes using the memory block.

8. The apparatus of claim 5, wherein memory access permissions in the subcontext mapping module are further configured to allow a plurality of threads running under the plurality of processes to access memory in a single subcontext.

9. The apparatus of claim 5, wherein the memory access permissions in the subcontext mapping module are further configured to allow an application in one subcontext to direct call into a system level library subcontext such that no context switch is required.

10. A system for controlling memory accesses between subcontexts, the system comprising:
    a computing device comprising
        a central processing unit and
        a random access memory accessible by the central processing unit;
    a subcontext memory association module configured to maintain assignments of memory blocks into subcontexts;
    a subcontext mapping module configured to maintain inter-subcontext memory access permissions, registered entry points, and inter-subcontext entry point permissions for each subcontext, each registered entry point comprising an accessor subcontext, a target subcontext, and a single entry point address, wherein only the target subcontext may create a registered entry point for the target subcontext; and
    a control module configured to prevent an inter-subcontext code call from the accessor subcontext to the target subcontext which does not use the registered entry point with an inter-subcontext entry point permission allowing the accessor subcontext to call into the target subcontext at the entry point address.

11. The system of claim 10 wherein the memory access prevented by the control module is selected from the group consisting of a memory read, a memory write, and an instruction load.

12. A computer readable storage medium embodying a program of machine-readable instructions executable by a digital processing apparatus to perform a set of operations to control memory accesses between subcontexts, the operations comprising:
    assigning memory blocks into specific subcontexts;
    maintaining inter-subcontext memory access permissions, registered entry points, and inter-subcontext entry point permissions for each subcontext, each registered entry point comprising an accessor subcontext, a target subcontext, and a single entry point address, wherein only the target subcontext may create a registered entry point for the target subcontext;
    tracking a memory access by computer code associated with the accessor subcontext into a memory block associated with the target subcontext; and
    preventing an inter-subcontext code call from the accessor subcontext to the target subcontext which does not use the registered entry point with an inter-subcontext entry point permission allowing the accessor subcontext to call into the target subcontext at the entry point address.

13. The computer readable medium of claim 12, wherein blocking the memory access blocks an access selected from the group consisting of a memory read, a memory write, and an instruction load.

14. The computer readable medium of claim 12, wherein the subcontext mapping module is integrated into a central processing unit of the digital processing apparatus.

15. A method comprising:
    assigning memory blocks to specific subcontexts and storing said assignments in a subcontext memory association module;
    storing inter-subcontext memory access permissions, registered entry points, and inter-subcontext entry point permissions for each subcontext, each registered entry point comprising an accessor subcontext, a target subcontext, and a single entry point address, wherein only the target subcontext may create a registered entry point for the target subcontext in a subcontext mapping module;

tracking a memory access by code associated with the accessor subcontext into a memory block associated with the target subcontext;

preventing an inter-subcontext code call from the accessor subcontext to the target subcontext which does not use the registered entry point with an inter-subcontext entry point permission allowing the accessor subcontext to call into the target subcontext at the entry point address.

* * * * *